J. M. McMaster.
Car Starter.
N° 92,335.   Patented Jul 6, 1869.

Witnesses:

Inventor:
J. M. McMaster

Sheet 2-2 Sheets.
J. M. McMaster.
Car Starter.
Patented Jul. 6. 1869.
N°. 92335.
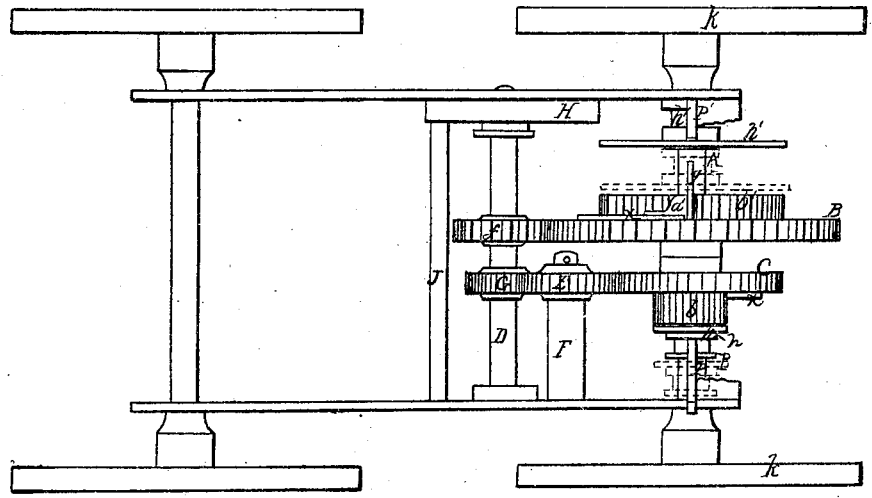
Witnesses:
William R. Oatley
H. H. Clement
Inventor:
J. M. McMaster
By Wm S Loughborough
Atty

United States Patent Office.

J. M. McMASTER, OF ROCHESTER, NEW YORK.

Letters Patent No. 92,335, dated July 6, 1869.

---

IMPROVED CAR-BRAKE AND STARTER.

---

The Schedule referred to in these Letters Patent and making part of the same.

---

*To all whom it may concern:*

Be it known that I, J. M. McMaster, of Rochester, in the county of Monroe, and State of New York, have invented a certain new and useful Car-Brake and Starter; and I do hereby declare that the following is a full, clear, and exact description thereof, reference being had to the accompanying drawings, making part of this specification, in which—

Figure 4, sheet B, is a plan view of my invention, the red lines indicating the different positions of the disks, $h$ and $h'$.

The object of this invention, the nature of which will be understood by reference to the drawings and specification, is to store up the momentum of a car while stopping, and use the same for starting it.

To enable others to make and use my invention, I will describe its construction and operation.

Figure 1:
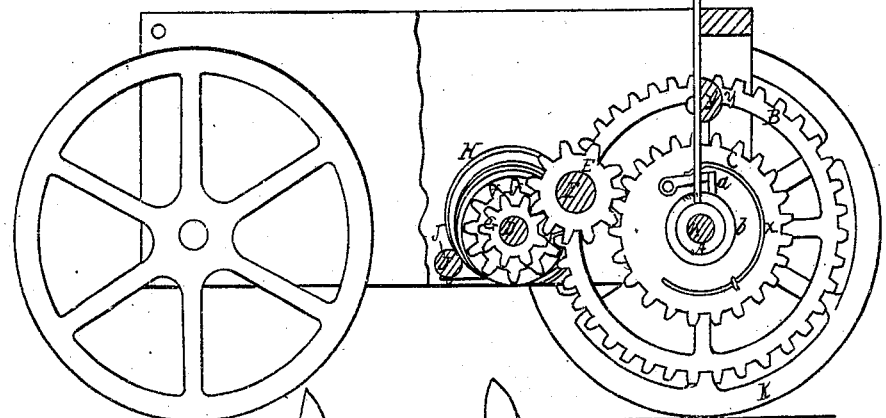
Figure 1 is a side elevation of my invention, having portions broken away to show the arrangement of the gearing.
Figure 2:
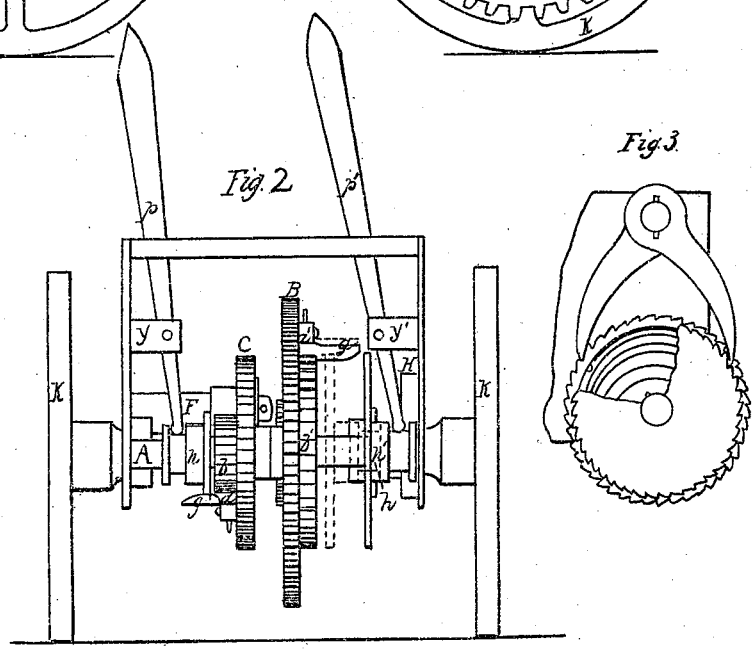
Figure 2 is an end elevation.
Figure 3:
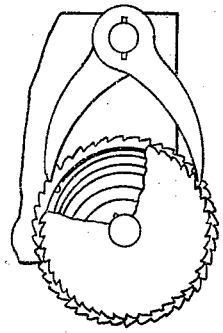
Figure 3 shows a modification, by which the device is simplified.

On the axle A, carrying ground-wheels $k$, figs. 1 and 2, I put two spur-wheels, B and C.

These wheels revolve loosely upon the axle, except when held by pawl $a$, and ratchet-wheel $b$, and pawl $a'$, and ratchet-wheel $b'$, fig. 2.

The ratchet-wheels $b$ and $b'$ are rigidly attached to the axle A, and the teeth of one are inclined in an opposite direction to those of the other, so that one of the wheels, B and C, will be held by its ratchet and pawl, whether the axle is turned backward or forward.

The pawl $a$ is pivoted to the spur-wheel C, and is kept in contact with the ratchet-wheel $b$, by a spring, $x$, figs. 1 and 4, and the pawl $a'$ is similarly arranged upon the wheel B.

The pawls have a projecting lip, $g$, fig. 2, under which the disks $h$ and $h'$ are moved, to raise the pawls from the ratchet-wheels; said lips having their inner edges curved or inclined, as shown.

The disks $h$ $h'$ slide on the axle A, and have each a groove cut in their hubs, into which the lower ends of the hand-levers $p$ $p'$ are fitted for the purpose of operating the disks and pawls.

These hand-levers are pivoted to the studs $y$ and $y'$, secured at proper points to the body of the car.

The spur-wheel B is larger in diameter than the wheel C, and gears into a pinion, $f$, figs. 1 and 4, which is rigidly attached to the countershaft D.

The spur-wheel C gears into a pinion, E, revolving loosely on the stud F, which pinion, in turn, gears into the pinion G, also rigidly attached to the shaft D.

This latter runs in boxes, secured in any desired manner to the body of the car, and to it I attach one end of a coiled spring, H, figs. 1, 2, and 4, the other end being attached to the bar J, or other convenient part of the car.

When this spring is wound up by the momentum of the car, through the medium of the gearing, it checks the revolution of the axle A, and its accumulated power can then be used to assist in starting the car.

The operation of my invention is as follows:

When it is desired to stop the car, the hand-levers $p$ $p'$ are moved so as to shift the disks $h$ and $h'$ away from the ratchet-wheels, and drop the pawls into gear.

This causes the spur-wheels B and C to revolve with the axle A, and motion is imparted to the countershaft D, winding up the spring and checking the motion of the ground-wheels $k$.

The power accumulated in the spring H, which is held in check by the combined action of the ratchet-wheels $b$ and $b'$, may now be used in starting the car.

If the pawl $a'$ is lifted by means of the disk $h'$ and lever $p'$, the car is moved in a certain direction. If, on the contrary, the pawl $a$ is lifted, the force of the spring is exerted to move the car in the opposite direction.

When both pawls are lifted from the ratchet-wheels, the axle A is left free to move in either direction.

I do not confine myself to the use of the coiled spring, as a straight or elliptic spring may be used, operating a chain wound around the shaft D.

A chain and chain-wheels may be used in place of the gears C E G to produce the reverse motion.

What I claim as my invention, and desire to secure by Letters Patent, is—

The arrangement of the gearing B C E and $f$ and G, spring H, ratchet-wheels $b$ and $b'$, in combination with the sliding disks $h$ and $h'$, and hand-levers $p$ and $p'$, for connecting and disconnecting the pawls $a$ and $a'$, in the manner shown, and for the purposes described.

J. M. McMASTER.

Witnesses:
JAS. LORENZO GAGE,
EDW. E. JOHNSON.